US008951665B2

(12) United States Patent
Keshavarz et al.

(10) Patent No.: US 8,951,665 B2
(45) Date of Patent: Feb. 10, 2015

(54) METHODS FOR THE PREPARATION OF ELECTROLYTES FOR CHROMIUM-IRON REDOX FLOW BATTERIES

(75) Inventors: Majid Keshavarz, Pleasanton, CA (US); Aravamuthan Varadarajan, Fremont, CA (US)

(73) Assignee: Imergy Power Systems, Inc., Fremont, CA (US)

( * ) Notice: Subject to any disclaimer, the term of this patent is extended or adjusted under 35 U.S.C. 154(b) by 805 days.

(21) Appl. No.: 12/721,411

(22) Filed: Mar. 10, 2010

(65) Prior Publication Data

US 2010/0261070 A1    Oct. 14, 2010

(51) Int. Cl.
*H01M 6/04*    (2006.01)
*H01M 8/18*    (2006.01)

(52) U.S. Cl.
CPC .............. *H01M 8/188* (2013.01); *Y02E 60/528* (2013.01)
USPC ........... 429/202; 429/101; 429/105; 429/107; 429/109; 429/408; 429/416; 429/421; 429/422; 252/182.1

(58) Field of Classification Search
USPC ......... 429/101, 105, 107, 109, 202, 408, 416, 429/421, 422; 252/182.1
See application file for complete search history.

(56) References Cited

U.S. PATENT DOCUMENTS

| | | | |
|---|---|---|---|
| 3,540,934 | A | 11/1970 | Boeke |
| 3,607,407 | A | 9/1971 | Adams |
| 3,899,404 | A | 8/1975 | Iverson |
| 3,996,064 | A | 12/1976 | Thaller |
| 4,111,688 | A | 9/1978 | Ichijo |
| 4,133,941 | A | 1/1979 | Sheibley |
| 4,159,366 | A | 6/1979 | Thaller |
| 4,308,324 | A | 12/1981 | Newman |
| 4,309,372 | A | 1/1982 | Sheibley |
| 4,312,735 | A | 1/1982 | Grimes et al. |
| 4,362,791 | A * | 12/1982 | Kaneko et al. ................ 429/101 |
| 4,414,090 | A | 11/1983 | D'Agostino et al. |

(Continued)

FOREIGN PATENT DOCUMENTS

| | | |
|---|---|---|
| DE | 102006007206 | 10/2006 |
| JP | 52155123 | 12/1977 |

(Continued)

OTHER PUBLICATIONS

M. Bartolozzi, "Development of Redox Flow Batteries. A Historical Biography," Journal of Power Sources, 27 (1989) 219-234.*

(Continued)

*Primary Examiner* — Ula C Ruddock
*Assistant Examiner* — Amanda Barrow
(74) *Attorney, Agent, or Firm* — Haynes and Boone, LLP

(57) ABSTRACT

A method for preparing a redox flow battery electrolyte is provided. In some embodiments, the method includes the processing of raw materials containing sources of chromium ions in a high oxidation state. In some embodiments, a solution of the raw materials in an acidic aqueous solution is subjected to a reducing process to reduce the chromium in a high oxide state to an aqueous electrolyte containing chromium (III) ions. In some embodiments, the reducing process is electrochemical process. In some embodiments, the reducing process is addition of an inorganic reductant. In some embodiments, the reducing process is addition of an organic reductant. In some embodiments, the inorganic reductant or the organic reductant includes iron powder.

20 Claims, 2 Drawing Sheets

(56) References Cited

U.S. PATENT DOCUMENTS

| | | | |
|---|---|---|---|
| 4,454,649 A | 6/1984 | Jalan et al. | |
| 4,468,441 A | 8/1984 | D'Agostino et al. | |
| 4,485,154 A | 11/1984 | Remick et al. | |
| 4,496,637 A | 1/1985 | Shimada et al. | |
| 4,543,302 A * | 9/1985 | Gahn et al. | 429/51 |
| 4,579,791 A | 4/1986 | Wang | |
| 4,732,827 A * | 3/1988 | Kaneko et al. | 429/202 |
| 4,784,924 A | 11/1988 | Savinell et al. | |
| 4,786,567 A * | 11/1988 | Skyllas-Kazacos et al. | 429/51 |
| 4,814,241 A | 3/1989 | Nagashima et al. | |
| 4,828,666 A | 5/1989 | Iizuka et al. | |
| 4,874,483 A * | 10/1989 | Wakabayashi et al. | 205/506 |
| 4,882,241 A | 11/1989 | Heinzel | |
| 4,894,294 A | 1/1990 | Ashizawa et al. | |
| 4,929,325 A | 5/1990 | Bowen et al. | |
| 4,945,019 A | 7/1990 | Bowen et al. | |
| 4,948,681 A | 8/1990 | Zagrodnik et al. | |
| 4,956,244 A | 9/1990 | Shimizu et al. | |
| 5,009,868 A | 4/1991 | Spitz et al. | |
| 5,061,578 A | 10/1991 | Kozuma et al. | |
| 5,162,168 A | 11/1992 | Downing et al. | |
| 5,188,911 A | 2/1993 | Downing et al. | |
| 5,258,241 A | 11/1993 | Ledjeff et al. | |
| 5,310,465 A * | 5/1994 | Vaughan | 205/750 |
| 5,324,341 A | 6/1994 | Nagel et al. | |
| 5,366,824 A | 11/1994 | Nozaki et al. | |
| 5,403,675 A | 4/1995 | Ogata et al. | |
| 5,648,184 A | 7/1997 | Inoue et al. | |
| 5,656,390 A | 8/1997 | Kageyama et al. | |
| 5,665,212 A | 9/1997 | Zhong et al. | |
| 5,759,711 A | 6/1998 | Miyabayashi et al. | |
| 5,851,694 A | 12/1998 | Miyabayashi et al. | |
| 6,005,183 A | 12/1999 | Akai et al. | |
| 6,040,075 A | 3/2000 | Adcock et al. | |
| 6,077,622 A | 6/2000 | Minohara | |
| 6,086,643 A | 7/2000 | Clark et al. | |
| 6,221,176 B1 * | 4/2001 | Merchant et al. | 148/264 |
| 6,461,772 B1 | 10/2002 | Miyake et al. | |
| 6,475,661 B1 | 11/2002 | Pellegri et al. | |
| 6,509,119 B1 | 1/2003 | Kobayashi et al. | |
| 6,524,452 B1 | 2/2003 | Clark et al. | |
| 6,555,267 B1 | 4/2003 | Broman et al. | |
| 6,562,514 B1 | 5/2003 | Kazacos et al. | |
| 6,692,862 B1 | 2/2004 | Zocchi | |
| 6,759,158 B2 | 7/2004 | Tomazic | |
| 6,761,945 B1 | 7/2004 | Adachi et al. | |
| 6,764,789 B1 | 7/2004 | Sekiguchi et al. | |
| 6,905,797 B2 | 6/2005 | Broman et al. | |
| 6,986,966 B2 | 1/2006 | Clarke et al. | |
| 7,061,205 B2 | 6/2006 | Shigematsu et al. | |
| 7,078,123 B2 | 7/2006 | Kazacos et al. | |
| 7,199,550 B2 | 4/2007 | Tsutsui et al. | |
| 7,220,515 B2 | 5/2007 | Ito et al. | |
| 7,227,275 B2 | 6/2007 | Hennessy et al. | |
| 2003/0008203 A1 | 1/2003 | Winter | |
| 2004/0170893 A1 | 9/2004 | Nakaishi et al. | |
| 2004/0191623 A1 * | 9/2004 | Kubata et al. | 429/189 |
| 2004/0202915 A1 | 10/2004 | Nakaishi et al. | |
| 2004/0241544 A1 | 12/2004 | Nakaishi et al. | |
| 2005/0074653 A1 | 4/2005 | Broman et al. | |
| 2005/0156431 A1 | 7/2005 | Hennessy | |
| 2005/0156432 A1 | 7/2005 | Hennessy | |
| 2005/0158615 A1 | 7/2005 | Samuel et al. | |
| 2005/0164075 A1 | 7/2005 | Kumamoto et al. | |
| 2005/0181273 A1 | 8/2005 | Deguchi et al. | |
| 2005/0260473 A1 | 11/2005 | Wang | |
| 2006/0013931 A1 * | 1/2006 | Bivens et al. | 426/417 |
| 2007/0072067 A1 | 3/2007 | Symons et al. | |
| 2007/0080666 A1 | 4/2007 | Ritter et al. | |
| 2007/0111089 A1 | 5/2007 | Swan | |
| 2007/0184542 A1 * | 8/2007 | Ejlertsson | 435/166 |
| 2008/0081247 A1 | 4/2008 | Nakaishi et al. | |
| 2008/0193828 A1 | 8/2008 | Sahu | |
| 2009/0218984 A1 | 9/2009 | Parakulam | |
| 2010/0003586 A1 | 1/2010 | Sahu | |
| 2010/0090651 A1 | 4/2010 | Sahu | |
| 2010/0092757 A1 | 4/2010 | Nair | |
| 2010/0092807 A1 | 4/2010 | Sahu | |
| 2010/0092813 A1 | 4/2010 | Sahu | |
| 2010/0092843 A1 | 4/2010 | Conway | |
| 2010/0094468 A1 | 4/2010 | Sahu | |
| 2010/0136455 A1 | 6/2010 | Winter | |
| 2010/0143781 A1 * | 6/2010 | Keshavarz et al. | 429/107 |
| 2010/0261070 A1 | 10/2010 | Keshavarz et al. | |

FOREIGN PATENT DOCUMENTS

| | | | |
|---|---|---|---|
| JP | 60047373 | 3/1985 | |
| JP | 60070672 | 4/1985 | |
| JP | 60-115174 | * 6/1985 | H01M 8/18 |
| JP | 60115174 | 6/1985 | |
| JP | 1060967 | 3/1989 | |
| JP | 1320776 | 12/1989 | |
| JP | 2027667 | 1/1990 | |
| JP | 2027668 | 1/1990 | |
| JP | 3017963 | 1/1991 | |
| JP | 8007913 | 1/1996 | |
| JP | 10012260 | 1/1998 | |
| JP | 10208766 | 8/1998 | |
| JP | 11329474 | 11/1999 | |
| JP | 2000058099 | 2/2000 | |
| JP | 2000200619 | 7/2000 | |
| JP | 2002015762 | 1/2002 | |
| JP | 2002175822 | 6/2002 | |
| JP | 2002289233 | 10/2002 | |
| JP | 2002367661 | 12/2002 | |
| JP | 2003173812 | 6/2003 | |
| JP | 2005142056 | 6/2005 | |
| JP | 2005228622 | 8/2005 | |
| JP | 2005228633 | 8/2005 | |
| JP | 2005322447 | 11/2005 | |
| JP | 2006114360 | 4/2006 | |
| JP | 2006147306 | 6/2006 | |
| JP | 2006147376 | 6/2006 | |
| JP | 2006313691 | 11/2006 | |
| JP | 2006351346 | 12/2006 | |
| JP | 2007087829 | 4/2007 | |
| WO | 8905528 | 6/1989 | |
| WO | WO9003666 | 4/1990 | |
| WO | 03005476 | 1/2003 | |
| WO | 2004079849 | 9/2004 | |
| WO | 2006135958 | 12/2006 | |

OTHER PUBLICATIONS

Welch et al., "Reduction of hexavalent chromium at solid electrodes in acidic media: reaction mechanism and analytical applications," Talanta, 65 (2005) 74-80.*

International Preliminary Report on Patentability and Written Opinion dated for related International Application No. PCT/US2011/027448, dated Sep. 11, 2012.

ISR and Written Opinion for related PCT Application No. PCT/US2011/027448, dated Apr. 27, 2011.

Search Report for PCT Application No. PCT/US2009/049285.

Search Report for PCT Application No. PCT/US2009/066888.

Office Action for U.S. Appl. No. 12/217,059 mailed Aug. 23, 2010.

Office Action for U.S. Appl. No. 12/577,137 mailed Sep. 7, 2010.

Office Action for U.S. Appl. No. 12/631,749 mailed Aug. 19, 2010.

* cited by examiner

METHODS FOR THE PREPARATION OF ELECTROLYTES FOR CHROMIUM-IRON REDOX FLOW BATTERIES

BACKGROUND

1. Technical Field

The present disclosure relates to methods for preparing electrolytes and electrolyte solutions useful in reduction-oxidation (redox) flow batteries.

2. Discussion of Related Art

There is an increasing demand for novel and innovative electric power storage systems. Reduction-oxidation (redox) batteries have become an attractive means for such energy storage. In certain applications, a redox flow battery or a redox flow cell may include positive and negative electrodes disposed in separate half-cell compartments. The two half-cells may be separated by a porous or ion-selective membrane, through which ions are transferred during a redox reaction. Electrolytes (anolyte and catholyte) are flowed through the half-cells as the redox reaction occurs, often with an external pumping system. In this manner, the membrane in a flow cell battery operates in an aqueous electrolyte environment. In some applications, an iron-ion containing aqueous hydrochloric acid solution may be used as the catholyte, while a chromium-ion containing aqueous hydrochloric acid solution may be used as the anolyte. In some applications, a mixture of chromium and iron containing solutions may be used on both sides of the redox cell. The use of mixed reactants eliminates the requirement for a highly-selective membrane since the composition of both half cells is identical in the discharged state.

In some redox flow batteries, certain metal impurities contained in the electrolyte solution can cause side reactions at the negative electrode, which can result in the evolution of hydrogen gas that adversely affects the coulombic efficiency of the battery. While the use of high-purity raw materials such as high-grade iron chloride and high-grade chromium chloride can suppress such hydrogen gas-forming reactions, such materials are typically too expensive for use in redox batteries on a commercial scale.

Therefore, there exists a need to develop methods for preparing and purifying electrolyte solutions from inexpensive raw materials.

SUMMARY

Consistent with some of the embodiments described herein, a method for preparing a redox flow battery electrolyte is provided. In some embodiments, the method includes dissolving a raw material that includes at least one source of chromium ions in a higher oxidation state in an acidic aqueous liquid to form a solution of chromium ions; subjecting the solution to a reductant to form Chromium (III) ions; and adding a source for Iron (II) ions.

Further embodiments and aspects of the invention are discussed with respect to the following figures, which are incorporated in and constitute a part of this specification.

Figure 1:
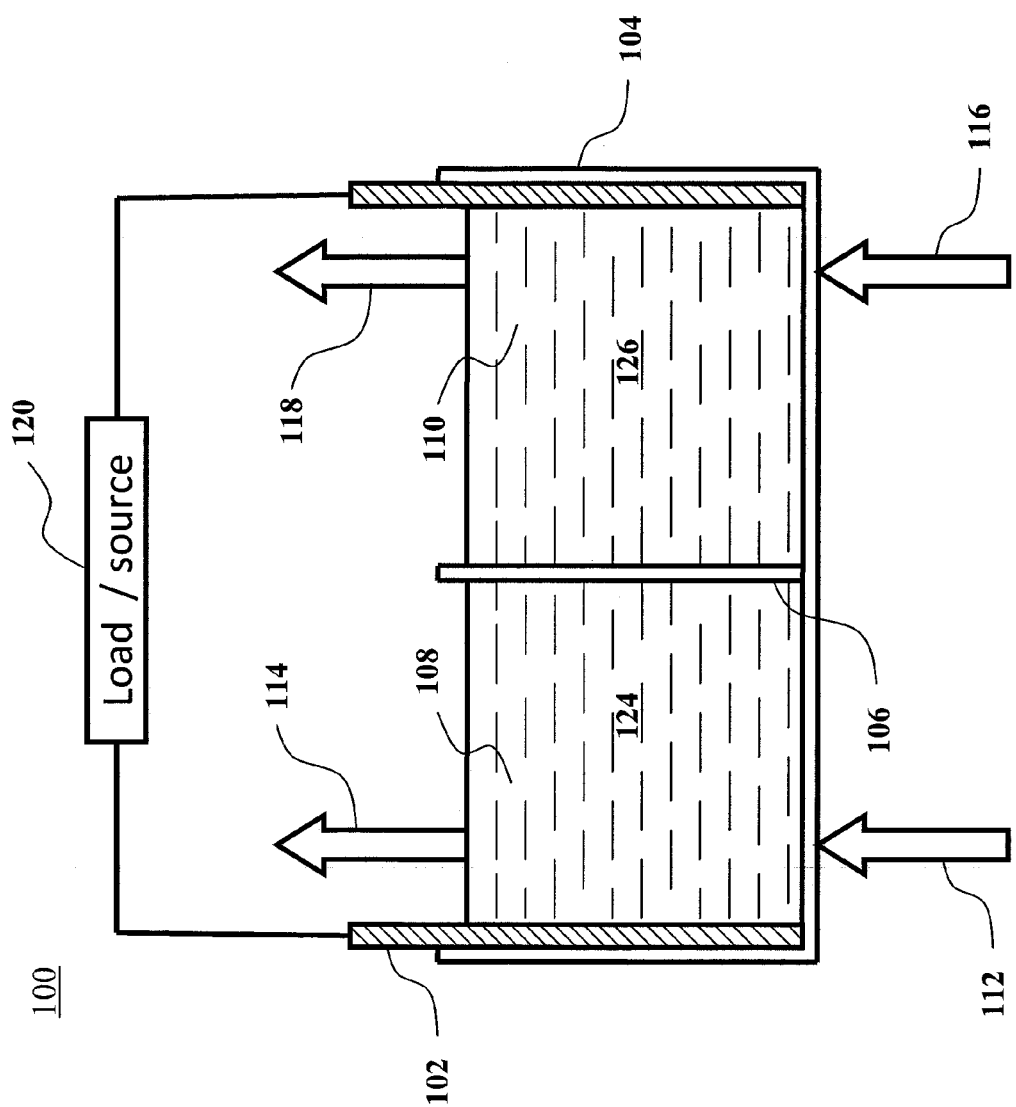
FIG. 1 illustrates a redox flow cell filled with electrolyte solution consistent with the embodiments described herein.

Relative sizes and distances depicted in the figure are for convenience of illustration and have no further meaning.

DETAILED DESCRIPTION

Some embodiments of the present invention provide for the processing of raw materials that are sources of chromium (VI) ions and/or iron. In some embodiments, the raw materials contain impurities, for example the raw materials are also a source of certain transition-metal ions. However, in many of the raw materials, the impurities are present in concentrations insufficient to significantly affect performance of a battery that utilizes the resulting electrolyte.

Consistent with some embodiments, the methods described herein include dissolving a raw material containing chromium in a higher oxidation state such as chromium (VI) in an acidic aqueous solution. In some embodiments, the acidic aqueous solution is then treated with a reductant. The reductant may be an organic reagent, an inorganic reagent, an electrochemical process, or any other way of reducing the high oxidation state chromium to a Cr(III) state.

Following the reduction treatment, in some embodiments iron metal is added, which can also serve to complete the reduction of the higher oxidation state chromium and provide Fe(II) ($Fe^{2+}$) to form an electrolyte formulation. Further, the acid concentration of the solution may be adjusted.

Consistent with some embodiments, the methods describe herein allow for the production of electrolyte solutions with low or minimal amounts of ionic impurities from sources containing high oxidation state chromium, for example Cr(VI). In some embodiments, the reduction process can be electrochemical. In some embodiments, the reduction process can be by addition of an organic reductant such formic acid, methanol, glucose or sucrose. In some embodiments, the reduction process can be by addition of an inorganic reductant such as sodium bisulfate or sodium dithionite. In some embodiments, the excess reductant and volatile impurities can be distilled off once the reduction process is complete, resulting in a redox electrolyte solution containing chromium ions. Iron is subsequently added in the same pot as part of the reducing mixture and or electrolyte constituent to adjust concentration of ions in the resulting electrolytes.

Low-cost raw materials containing sources of chromium ions and/or iron ions are desirable in that they can be processed for use as reduction-oxidation (redox) battery electrolytes. Some of the raw materials contain chromium in the +6 oxidation state (Chromium (VI)), including chromium trioxide ($CrO_3$), sodium dichromate ($Na_2Cr_2O_7$), potassium dichromate ($K_2Cr_2O_7$), sodium chromate ($Na_2CrO_4$), potassium chromate ($K_2CrO_4$), and chromyl chloride ($CrO_2Cl_2$). Those raw materials may also contain impurities, such as sources of certain metal species. However, these impurities may be present in the raw materials in small amounts that do not interfere with the battery operation or are reduced by the reductant to non-interfering species. Accordingly, some methods described herein provide an aqueous redox electrolyte substantially free of certain metal impurities.

As used in the present specification, the following words and phrases are generally intended to have the meanings as set forth below, except to the extent that the context in which they are used indicates otherwise.

As described herein, the term "reductant" refers to a reducing agent having strong reducing properties with a high overpotential for hydrogen reduction in aqueous acidic solutions. An example of high hydrogen overpotential would include reducing agents that exhibit little to no evolution of hydrogen gas in an aqueous acidic solution. Reductants utilized in some embodiments exhibit little or no interference (in their oxidized form) with the electrochemical process of the resulting electrolyte.

As described herein, the term "impurities" refers to those materials that deposit under reductive conditions and have low hydrogen overpotential. Examples of low hydrogen overpotential include materials that evolve hydrogen gas in an aqueous acidic environment.

Figure 2:
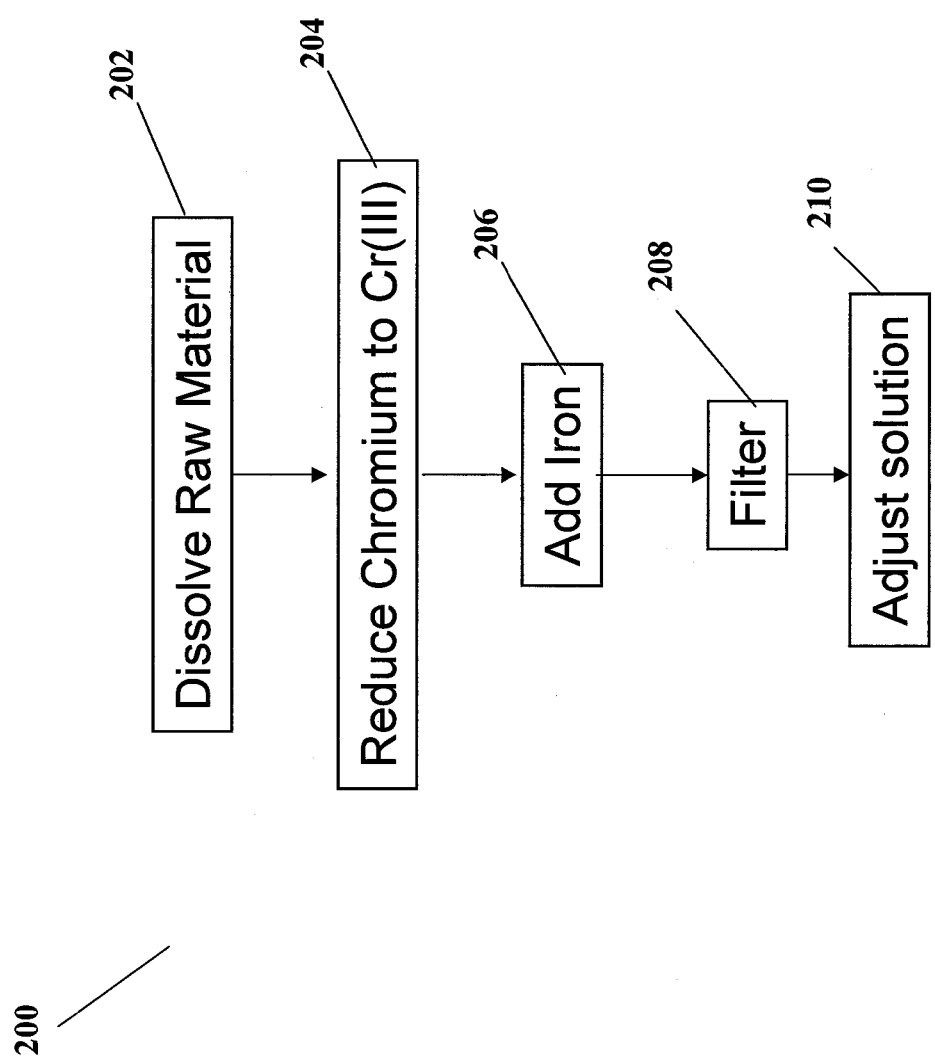
FIG. 2 illustrates a method of producing an electrolyte according to some embodiments of the present invention.

FIG. 2 illustrates a process 200 of producing an electrolyte according to some embodiments of the present invention. As shown in FIG. 2, in step 202 a raw material is dissolved or extracted in an acidic aqueous solution to form a solution of chromium ions. The solution may also include iron ions. In certain embodiments, the acidic aqueous solution may include hydrochloric acid (HCl). In some embodiments, HCl may be partially or completely replaced with other Brønsted acids, for example, sulfuric acid, sulfonic acid, phosphoric acid, phosphonic acid, perchloric acid, and mixtures thereof. In certain embodiments, a mixture of hydrochloric acid (HCl) and sulfuric acid may be used.

The raw material dissolved in the acidic aqueous solution in step 202 may further contain sources of certain impurities. Such impurities may include, but are not limited to, metal ions such as antimony, bismuth, cadmium, cobalt, copper, lead, manganese, molybdenum, niobium, nickel, titanium, tungsten, and zinc. In some embodiments, the raw material may contain sources of nickel ions, cobalt ions and/or sources of copper ions. In some embodiments, the raw material can be chromium trioxide.

In some embodiments, the raw material can be a sodium or potassium dichromate, can be a sodium or potassium chromate, can be chromyl chloride, can be iron metal, or may be a combination of these materials. In some embodiments, raw materials are chosen such that the typical impurity levels are low enough to be within an acceptable range of concentrations. For example, in some embodiments, the level of $Co^{2+}$ ions is below 10 ppm and may be between 1 and 10 ppm. In some embodiments, the level of $Ni^{2+}$ ions is below 10 ppm and may be between 1 and 10 ppm. In some embodiments, the level of $Cu^{2+}$ ions is below 10 ppm and may be between 1 and 10 ppm. In some embodiments, the level of $Cu^{2+}$ ions is below 1.0 ppm and may be between 0.1 and 1.0 ppm.

From step 202, process 200 proceeds to reduction process 204 where a reducing step is performed to reduce the chromium ions in the solution to the chromium (III) ($Cr^{3+}$) oxidation state. Reduction can be accomplished either chemically by addition of a reductant or electrochemically.

Electrolysis can be accomplished by submerging a single electrode or pairs of spaced electrodes in the solution. A few examples of the reduction process are provided below utilizing various electrode systems. One skilled in the art will recognize other processes that may also be utilized in reduction process 204. These processes are also considered to be within the scope of this disclosure.

In some embodiments, reduction of Cr(VI) to Cr(III) can be effected electrochemically. In certain circumstances, the reduction of Cr(VI) to Cr(III), can be accompanied by forming $Fe^{2+}$ ions using iron electrodes. The iron electrode should have impurity levels within the acceptable range of concentrations and therefore be substantially free from metals such as Cu, Ni, Pd, Pt, Au, and Ru, which when present in the electrolyte contribute to performance loss in a flow cell that utilizes the resulting electrolyte. However, Oxidation of $Fe^{2+}$ to $Fe^{3+}$ and precipitation of $Fe_2O_3$ and chromite ($FeCr_2O_4$) can interfere with an electrochemical process.

In certain embodiments, electrolysis can be carried out with $CrO_3$ in sulfuric acid. A variety of electrodes, such as carbon felt, glassy carbon, polypropylene graphite composite, titanium, mixed metal oxide (MMO), or others, can be used. Chromium(III) sulfate and oxygen are formed. The chromium sulfate can be converted to the hydroxide using calcium hydroxide and then to the chloride with HCl. Iron can be directly dissolved in the chromium chloride solution, or separately dissolved in HCl and mixed with $CrCl_3$. Lower concentrations of Cr(VI) and a low current density can be used. The current density usually drops as reduction process 204 proceeds.

In certain embodiments, electrolysis can be carried out with $CrO_3$ in hydrochloric acid. A variety of electrodes, such as carbon felt, glassy carbon, polypropylene graphite, or others, can be used. Chromium(III) chloride and chlorine are formed. Iron can be directly dissolved in the chromium chloride solution, or separately dissolved in HCl and mixed with $CrCl_3$. However, in some embodiments lower concentration of Cr(VI) and low current density should be used. For example, in some embodiments the Cr(VI) concentration is kept below 1.0 M. In some embodiments, the Cr(VI) concentration is kept below 1.0 M. In some embodiments, the Cr(VI) concentration can be below 0.5 M or even below 0.1 M. Further, in some embodiments the acid or base concentration can be between 1 and 4 M.

The current density usually drops as the reduction proceeds. In some embodiments, the voltage between the electrodes can be kept between 1 and 5 voltages and the electrode spacing between 1 and 5 centimeters. However, other concentrations, electrode voltages, and cell spacings can be utilized.

In certain embodiments, Cr(VI) can be reduced using inorganic reducing agents. The reducing agent can be sodium dithionite ($Na_2S_2O_4$) or sodium bisulfite ($NaHSO_3$), for example, resulting in a reduction product that contains Na salts along with Cr(III). The solution can be used for electrolyte preparation as sodium ion is not expected to be of serious consequence. However, if necessary, the sulfate can be converted to the hydroxide, filtered and then redissolved in HCl to obtain the chloride, which may also eliminate most of the sodium ions in the final electrolyte. Iron and HCl can be added to obtain the final electrolyte formulation.

In certain embodiments, reduction of Cr(VI) can be effected by organic reducing agents. Examples of organic reducing agents include monohydric alcohols such as methanol, ethanol and polyhydric alcohols, such as ethylene glycol and glucose. Formic acid for conversion of $CrO_3$ to chromium formates is also an example.

In certain embodiments, formic acid can be used for the reduction of Cr(VI) as defined in Equation 1:

$$CrO_3+1.5HCOOH+Fe+5HCl \rightarrow CrCl_3+FeCl_2+1.5CO_2+3H_2O+H_2 \quad (1)$$

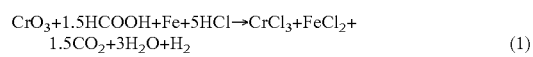

Stoichiometric amount (1.5 equivalents) or less than stoichiometric amount (1.0 equivalent) of formic acid can be used and iron powder is added to complete the reduction and provide the source for Fe2+ ions in the electrolyte solution.

In certain embodiments, oxalic acid can be used for the reduction as shown in Equation 2. However, the oxalate salt of chromium(III) may form and in such case can be converted to the chloride through the hydroxide.

$$CrO_3+1.5(COOH)_2+Fe+5HCl \rightarrow CrCl_3+FeCl_2+3CO_2+3H_2O+H_2 \quad (2)$$

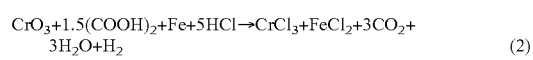

In certain embodiments methanol is the reductant as depicted in Equation 3:

$$CrO_3+0.5CH_3OH+Fe+5HCl \rightarrow CrCl_3+FeCl_2+0.5CO_2+2.5H_2O+H_2 \quad (3)$$

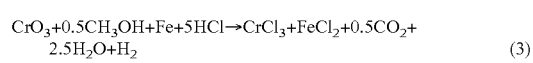

Reducing agents with higher carbon content can also be employed for the reduction. As shown in Equation 4, sugars such as glucose can be used in certain embodiments:

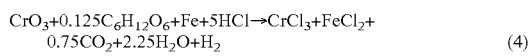

$$CrO_3 + 0.125C_6H_{12}O_6 + Fe + 5HCl \rightarrow CrCl_3 + FeCl_2 + 0.75CO_2 + 2.25H_2O + H_2 \quad (4)$$

In certain embodiments, higher carbohydrates such as cane sugar, raw sugar or sucrose can also be employed. However, it may be desirable to use smaller organic molecules in order to keep the level of organic carbon (from partially oxidized organic moieties) in the final electrolyte low, as these organic impurities may interfere with the redox processes in the battery.

In certain embodiments, where Cr(VI) species and HCl is evolved, considerable amount of chlorine gas may evolve. In those embodiments, provision can be made for venting the gas, for example, into the hood. The generation of chlorine can be minimized by using less concentrated HCl and/or carrying out the initial addition of the reducing agent at sub-ambient temperature, for example, using an ice-bath. In some embodiments, the $CrO_3$ concentration can be between 1 and 3 M and the HCL concentration between 1 and 12 M.

Since the starting Cr(VI) materials contain considerably lower levels of deleterious impurities such as Ni, CO and Cu ions, the reduction method yields electrolytes with low levels of these impurities. In some embodiments, the amount of nickel ions may be about 10 ppm or less. In some embodiments, the amount of nickel ions may be about 1 ppm or less. In some embodiments, the amount of nickel ions may be about 10 ppb or less. In some embodiments, the amount of cobalt and copper ions may be about 10 ppm or less. In some embodiments, the amount of cobalt and copper ions may be about 10 ppb or less.

Upon completion of the reduction reaction, process 200 proceeds to process step 206, where iron powder can be added to produce the electrolyte of desired composition. In certain embodiments, iron chloride can be prepared separately and added to the Cr(III) solution after reduction.

From process step 206, process 200 may proceed to filtering step 208. To remove insoluble materials, the solution may be filtered. Suitable filtration methods may include the use of a solid filter, such as filter paper or fritted discs, and a filter aid such as Celite®, Celpure® or Celatom®.

Once filtered, in step 210 concentrated HCl or HCl gas may be added to solution to achieve the desired acid concentration. After the desired ionic species are formed, the desired electrolyte can be formulated for use as a redox battery electrolyte by adding the appropriate amount of catalysts and additives.

FIG. 1 illustrates a redox flow cell 100 filled with electrolyte solution consistent with embodiments described. Redox flow cell 100 includes two half-cells 108 and 110 separated by permeable membrane 106. Half-cells 108 and 110 include electrodes 102 and 104 respectively, in contact with electrolytes 124 and 126, respectively, such that an anodic reaction occurs at the surface of one of electrodes 102 or 104 and a cathodic reaction occurs at the surface of the other one of electrodes 102 or 104. In some embodiments, multiple redox flow cells 100 can be electrically coupled (e.g., stacked) either in series to achieve higher voltage and/or in parallel in order to achieve higher current. When filled with electrolyte, one half-cell (e.g., 108 or 110) of redox flow cell 100 contains an anolyte and the other half-cell contains a catholyte, the anolyte and catholyte being collectively referred to as electrolytes. Reactant electrolytes may be stored in separate tanks and dispensed into the cells 108 and 110 via pipes coupled to cell input/output (I/O) ports 112, 114 and 116, 118, respectively, often using an external pumping system.

At least one electrode 102 and 104 in each half-cell 108 and 110 provides a surface on which the redox reaction takes place and from which charge is transferred. Redox flow cell 100 operates by changing the oxidation state of its constituents during charging or discharging. The two half-cells 108 and 110 are connected in series by the conductive electrolytes, one for anodic reaction and the other for cathodic reaction. In operation (i.e., charge or discharge), electrolyte (i.e., anolyte or catholyte) is flowed through half-cells 108 and 110 through I/O ports 112, 114 and 116, 118, respectively, as the redox reaction takes place. Positive ions or negative ions pass through permeable membrane 106 separating the two half-cells 108 and 110 as the redox flow cell 100 charges or discharges. Reactant electrolytes 124 and 126 are flowed through half-cells 108 and 110, as necessary and in a controlled manner to supply electrical power or be charged by load/source 120.

In the examples below, the following abbreviations have the following meanings. If an abbreviation is not defined, it has its generally accepted meaning.

mL=milliliters
L=liters
° C.=degrees Celsius
M=molarity
N=normality
ppm=parts per million
ppb=parts per billion
$N_2$=nitrogen gas
cm=centimeters
$HNO_3$=nitric acid
$PbCl_2$=lead chloride
Co=cobalt
Cu=copper
Ni=nickel
$CrO_3$=chromium trioxide
$K_2Cr_2O_7$=potassium dichromate
$Na_2S_2O_4$=sodium dithionite
DI=deionized
g=gram
hr=hour
min=minute
rt=room temperature Cr(VI) Reduction Procedures A. Electrochemical Reduction Example 1

Into a solution (50 mL) of $Na_2Cr_2O_7$ (0.025 M) in $H_2SO_4$ (4 M) two carbon felt electrodes with active area 3×2 cm² and separated by 2 cm were immersed in the solution. Using a power supply, a voltage of 3.4 V to 5.5 V was applied over a period of 4 hr, during which time the current dropped from 512 mA to 109 mA. Aliquots were taken at different time intervals and the concentrations of $Cr^{3+}$ and $Cr^{6+}$ were measured using UV-VIS spectrophotometry by measuring the absorbance at 586 nm and 349 nm, respectively. The electrodes were removed, iron powder (0.1 g, 1.79 mmol) was added, and the mixture stirred to dissolve the iron. After filtration, the concentrations of $Cr^{3+}$ and $Fe^{2+}$ were measured by UV-VIS spectrophotometry to be 0.062 M and 0.063 M, respectively, and the acid concentration by pH titration to be approximately 4.2 M. The concentrations of Co, Ni and Cu were determined by ICPMS to be 0.046 ppm, 0.0015 ppm and 0.0007 ppm, respectively.

Example 2

Into a solution (50 mL) of $Na_2Cr_2O_7$ (0.025 M) in HCl (4 M) two carbon felt electrodes with active area 4×2.5 cm$^2$ and separated by 2 cm were immersed in the solution. Using a power supply, a voltage of 2.5 V to 4.2 V was applied over a period of 4 hr, during which time the current dropped from 515 mA to 22 mA. Aliquots were taken at different time intervals and the concentrations of $Cr^{3+}$ and $Cr^{6+}$ were measured using UV-VIS spectrophotometry by measuring the absorbance at 587 nm and 346 nm, respectively. The electrodes were removed, iron powder (0.047 g, 0.84 mmol) was added, and the mixture stirred to dissolve the iron. After filtration, the concentrations of $Cr^{3+}$ and $Fe^{2+}$ were measured by UV-VIS spectrophotometry to be 0.049 M and 0.046 M, respectively, and the acid concentration by pH titration to be approximately 3.8 M. The concentrations of Co, Ni and Cu were determined by ICPMS to be 0.017 ppm, 1.3 ppm and 0.047 ppm, respectively.

Example 3

Into a solution (50 mL) of $CrO_3$ (0.05 M) in HCl (4 M) two carbon felt electrodes were immersed (active area 3×3 cm$^2$ separated by 2 cm. Using a power supply, a voltage of 3.9 V to 4.3 V was applied over a period of 2.45 hr, during which time the current dropped from 519 mA to 34 mA. Aliquots were taken at different time intervals and the concentrations of $Cr^{3+}$ and $Cr^{6+}$ were measured using UV-VIS spectrophotometry by measuring the absorbance at 580 nm and 340 nm, respectively. The electrodes were removed, iron powder (0.093 g, 1.68 mmol) was added, and the mixture stirred to dissolve the iron. After filtration, the concentrations of $Cr^{3+}$ and $Fe^{2+}$ were measured by UV-VIS spectrophotometry to be 0.06 M and 0.09 M, respectively, and the acid concentration by pH titration to be approximately 0.27 M. The concentrations of Co, Ni and Cu were determined by ICPMS to be 0.021 ppm, 0.00076 ppm and 0.00032 ppm, respectively.

B. Chemical Reduction with Inorganic Reducing Agents

Example 4

To a solution of sodium dichromate (1 M, 50 mL) in 4 M HCl, $NaHSO_3$ (9 g; 85 mmol) was added in small portions over 30 min, during which time the temperature rose from ambient to 77° C. The mixture was allowed to cool and Fe powder (3.63 g, 65 mmol) was added in small amounts over 1 hr. The solution was stirred for 12 hr, diluted with water (25 mL), and filtered through Celatom FW-80. The filtrate was analyzed by UV-VIS spectrophotometry for $Cr^{3+}$ and $Fe^{2+}$ concentrations which were 1.82 M and 0.7 M, respectively.

Example 5

To a solution of $CrO_3$ (7.5 g; 0.075 mole) in 4 M HCl (50 mL), sodium dithionite, $Na_2S_2O_4$, (6.53 g; 0.0375 mol) was added in small amounts over 2 hr. The reaction temperature rose from 22° C. to 70° C. The mixture was cooled to ambient temperature and iron powder (2.8 g; 0.05 mole) was added in small amounts over 3.5 hr. The mixture was stirred for 12 hr and filtered as above. The concentrations of $Cr^{3+}$ and $Fe^{2+}$ were determined spectrophotometrically to be 1.36 M and 0.85 M respectively, and the acid concentration by pH titration to be 0.09 M. The concentrations of Co, Ni and Cu were 0.58 ppm, 0.11 ppm and 0.23 ppm respectively, as measured by ICPMS.

Example 6

To a solution of $CrO_3$ (3.75 g; 0.0375 mole) in 4 M HCl (25 mL), sodium dithionite, $Na_2S_2O_4$, (1.63 g; 0.0375 mole) was added in small amounts over 3 hr. The reaction temperature rose from 22° C. to 65° C. The mixture was cooled to ambient temperature and iron powder (1.4 g; 0.025 mole) was added in small amounts over 4 hr. An additional quantity of dithionite (0.81 g; 0.019 mole) was added slowly. The mixture was treated with 12 M HCl (2 mL). The mixture was stirred for 12 hr and filtered as above. The concentrations of $Cr^{3+}$ and $Fe^{2+}$ were determined spectrophotometrically to be 1.77 M and 0.93 M, respectively, and the acid concentration by pH titration to be 0.33 M. The concentrations of Co, Ni and Cu were 0.44 ppm, 0.57 ppm and 0.47 ppm, respectively, as measured by ICPMS.

C. Chemical Reduction with Organic Reducing Agents

Example 7

A solution of $CrO_3$ (150 g; 1.5 mole) in 9 M HCl (1000 mL) was treated with HCOOH (103.57 g; 2.25 mole) in small amounts over 18 hr during which the temperature varied from 33° C. to 47° C. After the addition was complete, the mixture was heated to 57° C. and stirred for 8 hr to complete the reduction. The mixture was cooled to ambient temperature and Fe powder (325 mesh; 55 g; 1 mole) was added in small amounts. After completion of addition, the mixture was stirred at ambient temperature for 16 hr, and filtered through a bed of Celatom FW-80. The acid concentration was raised by passing HCl gas into the solution. The concentrations of Cr and Fe were measured by UV-VIS spectroscopy to be 1.4 M and 0.92 M, respectively. The acid concentration was measured by pH titration to be 2.25 M. Concentrations of other elements measured by ICPMS were: C 690 ppm; Co 0.01 ppm; Ni 1.2 ppm; and Cu below detection limit.

Example 8

A solution of $CrO_3$ (15 g; 0.15 mole) in 1 M HCl (100 mL) was treated with HCOOH (10.32 g; 0.225 mole) in small amounts over 0.25 hr during which the temperature varied from 24° C. to 54° C. HCl (12M; 30 mL) was added in three installments. The mixture was then heated to 68° C. over 19 hr and more HCl (12 M; 17 mL) was added. The solution was cooled to ambient temperature and Fe powder (5.52 g; 0.1 mole) was added gradually. After the addition was complete, the mixture was stirred for 8 hr and filtered through a bed of Celatom FW-80. The concentrations of Cr and Fe were measured by UV-VIS spectroscopy to be 0.9 M and 0.66 M, respectively. The acid concentration was measured by pH titration to be 0.16 M. Concentrations of other elements measured by ICPMS were: C 690 ppm; Co 0.0057 ppm; Ni 0.95 ppm; and Cu 0.0011 ppm.

Example 9

A solution of $CrO_3$ (75 g; 0.75 mole) in 4.5 M HCl (500 mL) was treated with HCOOH (51.78 g; 1.125 mole) in small amounts over 4 hr during which the temperature varied from 26° C. to 74° C. When the solution cooled to 30° C., it was then heated to 69° C. over 19 hr. The solution was cooled to ambient temperature and Fe powder (28 g; 0.5 mole) was added gradually. During the addition of Fe, HCl (12M; 70 mL) was added in four installments. After the addition was complete, the mixture was stirred for 19 hr and filtered through a bed of Celatom FW-80. The acid concentration was raised by passing HCl gas into the solution. The concentrations of Cr and Fe were measured by UV-VIS spectroscopy to be 1.36 M and 0.96 M respectively. The acid concentration was measured by pH titration to be 2.37 M. Concentrations of other elements measured by ICPMS were: C 610 ppm; Co 0.048 ppm; Ni 2 ppm; and Cu 0.32 ppm.

Example 10

A solution of $CrO_3$ (75 g; 0.75 mole) in 6 M HCl (500 mL) was treated with HCOOH (51.78 g; 1.125 mole) in small amounts over 8 hr during which the temperature varied from 31° C. to 78° C. When the solution cooled to 27° C., it was then heated to 69° C. over 19 hr. The solution was cooled to ambient temperature and Fe powder (28 g; 0.5 mole) was added gradually. During the addition of Fe, HCl (12M; 40 mL) was added in four installments. After the addition was complete, the mixture was stirred for 22 hr and filtered through a bed of Celatom FW-80. The concentrations of Cr and Fe were measured by UV-VIS spectroscopy to be 1.35 M and 0.9 M, respectively. The acid concentration was measured by pH titration to be 0.99 M. Concentrations of other elements measured by ICPMS were: C 570 ppm; Co 0.048 ppm; Ni 0.88 ppm; and Cu 0.01 ppm. The amount of total of organic carbon (TOC) was analyzed to be less than 0.4%.

Example 11

A solution of $CrO_3$ (75 g; 0.75 mole) in 6 M HCl (500 mL) was treated with HCOOH (34.52 g; 0.75 mole) in small amounts over 1 hr during which the temperature varied from 23° C. to 60° C. When the solution cooled to 30° C., it was then heated to 63° C. over 11 hr. The solution was cooled to ambient temperature and Fe powder (325 mesh, 28 g; 0.5 mole) was added gradually. During the addition of Fe, HCl (12M; 84 mL) was added in four installments. After the addition was complete, the mixture was stirred for 24 hr and filtered through a bed of Celatom FW-80. The solution was concentrated by distilling the solvent under vacuum. The residual material (260 mL) was treated with HCl (6 M; 150 mL) and $H_2O$ (50 mL). The concentrations of Cr and Fe were measured by UV-VIS spectroscopy to be 1.32 M and 0.99 M, respectively. The acid concentration was measured by pH titration to be 2.25 M. Concentrations of other elements measured by ICPMS were: C 100 ppm; Co 0.014 ppm; Ni 1.5 ppm; and Cu 0.18 ppm.

Example 12

A solution of 6 M HCl (100 mL) was cooled in an ice-bath to 4° C. $CrO_3$ (15 g; 0.15 mole) was added in small amounts over 1 hr. HCOOH (5.75 g; 0.15 mole) was added in small amounts over 5 min. The mixture was allowed to warm to ambient temperature and then heated to 66° C. over 11 hr. The solution was cooled to ambient temperature and Fe powder (5.6 g; 0.1 mole) was added gradually. After the addition of Fe, HCl (12M; 20 mL) was added in four installments. The mixture was stirred for 20 hr and filtered through a bed of Celatom FW-80. The concentrations of Cr and Fe were measured by UV-VIS spectroscopy to be 1.26 M and 0.93 M, respectively. The acid concentration was measured by pH titration to be 1.31 M. Concentrations of other elements measured by ICPMS were: C 670 ppm; Co 0.24 ppm; Ni 1.6 ppm; and Cu 0.078 ppm.

Example 13

A solution of $CrO_3$ (3.75 g; 0.0375 mole) in 4 M HCl (50 mL) was treated with oxalic acid, $(COOH)_2$ (7.09 g; 0.056 mole) in small amounts over 3 hr during which the temperature varied from 23° C. to 84° C. After the addition, when the solution cooled to ambient temperature, Fe powder (325 mesh, 1.4 g; 0.025 mole) was added gradually. After the addition was complete, the mixture was stirred for 4 hr and filtered through a bed of Celatom FW-80. The concentrations of Cr and Fe were measured by UV-VIS spectroscopy to be 1.35 M and 1.12 M, respectively. The acid concentration was measured by pH titration to be 0.03 M. Concentrations of other elements measured by ICPMS were: C 5800 ppm; Co 0.77 ppm; Ni 0.0011 ppm; and Cu 0.001 ppm.

Example 14

A solution of $CrO_3$ (3.75 g; 0.0375 mole) in 4 M HCl (25 mL) was treated with methanol (0.6 g; 0.0185 mole) drop wise during which the temperature varied from 23° C. to 81° C. After 3 hr, when the solution cooled to ambient temperature, Fe powder (325 mesh, 1.4 g; 0.025 mole) was added gradually. After the addition was complete, HCl (12 M; 2 mL) was added and the mixture was stirred for 18 hr. The mixture was then filtered through a bed of Celatom FW-80. The concentrations of Cr and Fe were measured by UV-VIS spectroscopy to be 1.84 M and 0.95 M, respectively. The acid concentration was measured by pH titration to be 0.19 M. Concentrations of other elements measured by ICPMS were: C 1200 ppm; Co 0.44 ppm; Ni 0.57 ppm; and Cu 0.27 ppm.

Example 15

A solution of 9.5 M HCl (500 mL) was cooled in an ice-bath to 8° C. $CrO_3$ (75 g; 0.75 mole) was added in small amounts over 2 hr. Methanol (12.02 g; 0375 mole) was added in small amounts over 6 hr. The mixture was allowed to warm to ambient temperature and stirred for 14 hr. The solution was cooled to ambient temperature and Fe powder (28 g; 0.5 mole) was added over 1 hr. The mixture was stirred for 22 hr and filtered through a bed of Celatom FW-80. The filter cake was washed with HCl (6 M; 3×10 mL) and the washings were combined with the filtrate. The concentrations of Cr and Fe were measured by UV-VIS spectroscopy to be 1.56 M and 1.09 M, respectively. The acid concentration was measured by pH titration to be 2.25 M. Concentrations of other elements measured by ICPMS were: C 1600 ppm; Co 0.004 ppm; Ni 1.4 ppm; and Cu 0.0049 ppm. The amount of total of organic carbon (TOC) was analyzed to be less than 0.4%.

Example 16

To a solution of $CrO_3$ (150 g; 1.5 mole) in 8 M HCl (1000 mL), glucose (50 g; 0.277 mole) was added in small amounts over 4.5 hr during which time the temperature varied from 33 to 97° C. After 12 hr, when the solution cooled to ambient temperature, Fe powder (325 mesh, 55.85 g; 1.0 mole) was added over 6.5 hr. After the addition was complete, the mixture was stirred for 16 hr. The mixture was then filtered through a bed of Celatom FW-80. The acid concentration was raised by passing HCl gas into the solution. The concentrations of Cr and Fe were measured by UV-VIS spectroscopy to be 1.5 M and 1.3 M, respectively. The acid concentration was measured by pH titration to be 2.58 M. Concentrations of other elements measured by ICPMS were: C 3500 ppm; Co 0.0051 ppm; Ni 0.99 ppm; and Cu 0.076 ppm.

Example 17

To a solution of $CrO_3$ (1 M; 8 mL) in 4 M HCl (1000 mL), raw sugar (sucrose; 0.345 g; 1 mmol) was added at which time the temperature was within a range from 22° C. to 42° C. After 4 hr, during which time the solution cooled to ambient temperature, the mixture was filtered through a bed of Celatom FW-80. The concentration of Cr was measured by UV-VIS spectroscopy to be 1.26 M. The acid concentration was measured by pH titration to be 1.73 M. Concentrations of other elements measured by ICPMS were: C 6600 ppm; Co 0.093 ppm; Ni 0.0012 ppm; and Cu 0.04 ppm. The solution can be formulated to the desired electrolyte composition by the addition of appropriate amounts of iron and HCl.

Example 18

FIG. 1 depicts a flow cell. In the flow cell, a total volume of electrolyte as produced in Example 7 above in each compartment 124 and 126 was roughly 150 mL. The charging current density was 40 mA/cm$^2$. Charge/discharge cycles were carried out within the state of charge limits of 20% and 80%. Polarization measurement gave area resistivity values of 1.79 $\Omega cm^2$ for charge and 1.75 $\Omega cm^2$ for discharge for the first cycle, and 1.93 $\Omega cm^2$ for charge and 1.88 $\Omega cm^2$ for the discharge.

Other embodiments will be apparent to those skilled in the art from consideration of the specification and practice disclosed herein. It is intended that the specification and examples be considered as exemplary only, with a true scope and spirit of the invention being indicated by the following claims.

What is claimed is:

1. A method for preparing a redox battery electrolyte, comprising:
   dissolving a raw material that includes at least one source of chromium ions in a first oxidation state in an acidic aqueous liquid to form a solution of chromium ions;
   reducing the chromium ions in the solution to a second oxidation state that is lower than the first oxidation state by subjecting the solution to a reductant until substantially all of the chromium ions in the first oxidation state are reduced to the second oxidation state, wherein the chromium ions in the first oxidation state comprise chromium(VI) ions and the chromium ions in the second oxidation state comprise chromium (III) ions; and
   after reducing the chromium ions in the solution, adding a source of iron (II) ions to the solution, the source of iron (II) ions comprising iron powder, to form the redox battery electrolyte.

2. The method of claim 1, further comprising filtering the solution.

3. The method of claim 2, wherein filtering the solution includes filtering with a solid filter and a filter aid.

4. The method of claim 1, wherein subjecting the solution to a reductant includes reducing the chromium ions in the solution with an electrochemical reaction using at least one electrode.

5. The method of claim 4, wherein the at least one electrode is comprised of at least one material from the set of titanium, carbon felt, glassy carbon, graphite, polypropylene graphite composite, iron, steel, and mixed metal oxide.

6. The method of claim 1, wherein the at least one source of chromium ions includes a soluble dichromate salt of sodium or potassium.

7. The method of claim 1, wherein the at least one source of chromium ions includes a soluble chromate salt of sodium or potassium.

8. The method of claim 1, wherein the at least one source of chromium ions includes chromium trioxide.

9. The method of claim 1, wherein the at acidic solution includes at least one of the acids chosen from the set of hydrochloric acid, hydrobromic acid, sulfuric acid, sulfonic acid, phosphoric acid, phosphonic acid, perchloric acid, and carboxylic acids.

10. The method of claim 1, wherein the acidic solution includes hydrochloric acid.

11. The method of claim 1, wherein subjecting the solution to a reductant includes adding an inorganic reducing agent to the solution.

12. The method of claim 11, wherein the inorganic reducing agent includes at least one of the set sodium dithionite, sodium bisulfate, sodium metabisulfite, and sodium sulfite.

13. The method of claim 11, wherein adding an inorganic reducing agent to the solution includes adding less than a stoichiometric amount of the inorganic reducing agent to the solution.

14. The method of claim 1, wherein subjecting the solution to a reductant includes adding an organic reducing agent to the solution.

15. The method of claim 13, wherein the organic reducing agent includes at least one of the set formic acid, oxalic acid, methanol, ethanol, lower alcohol, ethylene glycol, glucose, sucrose, raw sugar, and molasses.

16. The method of claim 14, wherein less than stoichiometric amount of the organic reducing agent is added to the solution.

17. The method of claim 16, wherein one equivalent of the organic reducing agent is used.

18. The method of claim 1, wherein subjecting the solution to a reductant includes adding iron powder to the solution.

19. The method of claim 1, further including adjusting an acid concentration of the solution to form an electrolyte.

20. The method of claim 4, wherein electrochemical reduction occurs until an electrochemical current is reduced indicating a substantial reduction of all the chromium ion in the first oxidation state.

* * * * *